(12) United States Patent
Duellman

(10) Patent No.: US 11,156,584 B2
(45) Date of Patent: Oct. 26, 2021

(54) PREDICTIVE LIFESPAN OF ANALYTICAL SENSORS

(71) Applicant: Rosemount Inc., Shakopee, MN (US)

(72) Inventor: Joshua M. Duellman, Winona, MN (US)

(73) Assignee: Rosemount Inc., Shakopee, MN (US)

(*) Notice: Subject to any disclaimer, the term of this patent is extended or adjusted under 35 U.S.C. 154(b) by 330 days.

(21) Appl. No.: 16/138,285

(22) Filed: Sep. 21, 2018

(65) Prior Publication Data

US 2020/0096477 A1 Mar. 26, 2020

(51) Int. Cl.
*G01N 27/416* (2006.01)

(52) U.S. Cl.
CPC ................. *G01N 27/4165* (2013.01)

(58) Field of Classification Search
CPC ............ G01N 27/333; G01N 27/4163; G01N 27/4165
See application file for complete search history.

(56) References Cited

U.S. PATENT DOCUMENTS

| | | | |
|---|---|---|---|
| 5,016,201 A | | 5/1991 | Bryan et al. |
| 5,320,735 A | * | 6/1994 | Kato ............... G01N 27/333 204/192.1 |
| 5,690,893 A | * | 11/1997 | Ozawa ............ G01N 35/00732 422/63 |
| 6,484,107 B1 | * | 11/2002 | Roper ................. G01D 1/00 702/50 |
| 6,654,697 B1 | | 11/2003 | Eryurek et al. |
| 6,907,383 B2 | | 6/2005 | Eryurek et al. |
| 7,254,518 B2 | | 8/2007 | Eryurek et al. |
| 7,290,450 B2 | | 11/2007 | Brown et al. |
| 7,581,434 B1 | * | 9/2009 | Discenzo .......... G01N 33/2888 73/53.01 |
| 7,630,361 B2 | | 12/2009 | Chapman |
| 7,680,460 B2 | | 3/2010 | Nelson |
| 7,949,495 B2 | | 5/2011 | Wiklund et al. |
| 7,991,582 B2 | | 8/2011 | Longsdorf et al. |
| 8,290,721 B2 | | 10/2012 | Wehrs et al. |
| 2007/0137292 A1 | * | 6/2007 | Xian ................. G01N 33/2823 73/152.18 |
| 2014/0180047 A1 | | 6/2014 | Fennell et al. |

OTHER PUBLICATIONS

International Search Report and Written Opinion for International Patent Application No. PCT/US2019/051478, dated Jan. 3, 2020, date of filing Sep. 17, 2019, 11 pages.

* cited by examiner

*Primary Examiner* — Elias Desta
(74) *Attorney, Agent, or Firm* — Christopher R. Christenson; Kelly, Holt & Christenson PLLC

(57) ABSTRACT

A process analytic system includes an analytic sensor configured to sense a characteristic of a fluid. The process analytic system also includes measurement circuitry coupled to the analytic sensor and configured to generate an indication of the characteristic of the fluid. The process analytic system includes a processor coupled to the measurement circuitry and configured to receive the indication of the characteristic of the fluid and calculate a sensor-related output based on the indication of the characteristic of the fluid. In addition, the process analytic system includes a diagnostics component configured to determine a rate of degradation of the analytic sensor based on the sensor-related output and a reference value, wherein the rate of degradation is compared to a pre-selected threshold.

18 Claims, 8 Drawing Sheets

PREDICTIVE LIFESPAN OF ANALYTICAL SENSORS

BACKGROUND

Process analytic sensors offer measurement analytics for a variety of industrial processes. Process analytic sensors operate by being placed in a process stream to measure or detect a given characteristic of the process stream. Process analytic sensors can be used for a variety of process mixtures including liquids, gases, solids or combinations thereof, in a variety of industrial processes. Particularly they can be useful in chemical process, power plants, refining, food and beverage processing, pharmaceutical processing, and water and wastewater treatment.

The rate of degradation of a process analytic sensor depends greatly on many external factors. Process analytic sensors can degrade more or less quickly depending on factors like temperature, flow rate, the chemical composition of the process fluid, the presence of entrained fluids, the pH level of the fluid, along with many other factors. Some of the degradation experienced by sensors includes, but is not limited to, membrane and electrolyte solution aging, chemical erosion, and coating or plugging of the sensor. In pH sensors, for example, the accuracy of the sensor can be reduced over time because of reference impedance when the sensor becomes coated, or because of pH slope degradation. This can result in measurement inaccuracy, damage, and potential hazards for the system. Users are responsible for providing maintenance on their sensors or for tracking values while calibrating sensors (such as pH slope, pH offset, etc.). Current recommendations for sensor maintenance or replacement rely on fixed timeframes, and many user manuals state that optimum maintenance frequency is best determined by experience.

SUMMARY

A process analytic system includes an analytic sensor configured to sense a characteristic of a fluid. The process analytic system also includes measurement circuitry coupled to the analytic sensor and configured to generate an indication of the characteristic of the fluid. The process analytic system includes a processor coupled to the measurement circuitry and configured to receive the indication of the characteristic of the fluid and calculate a sensor-related output based on the indication of the characteristic of the fluid. In addition, the process analytic system includes a diagnostics component configured to determine a rate of degradation of the analytic sensor based on the sensor-related output and a reference value, wherein the rate of degradation is compared to a pre-selected threshold.

DETAILED DESCRIPTION

Figure 1:
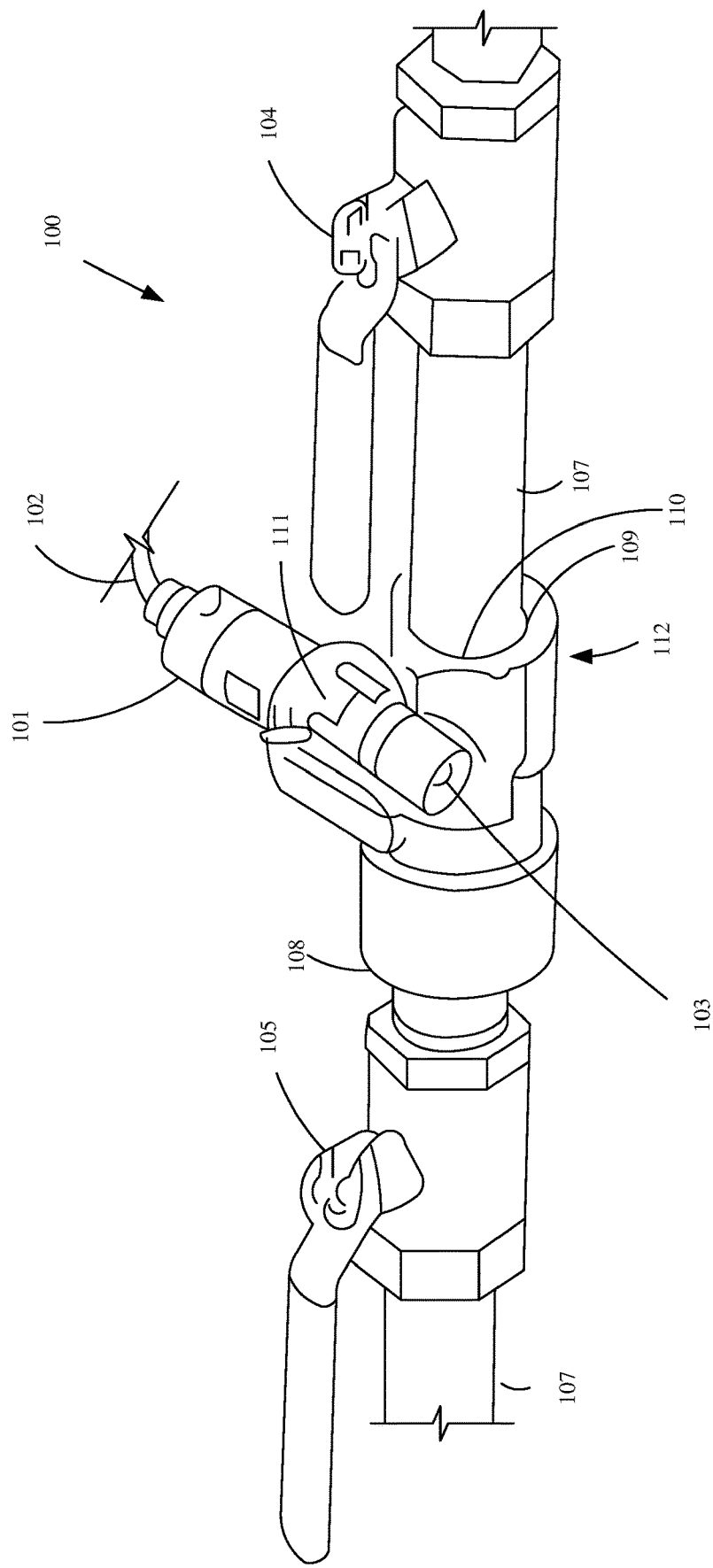
FIG. 1 is a partial cutaway view showing one example of a pH sensor within a process environment.

Process analytic sensors are often deployed in process environments. These sensors typically degrade over time and need to be maintained or replaced. Current recommendations for maintenance or replacement, however, do not offer accurate timing, particularly because the rate of degradation depends greatly on many different external factors. In fact, many current recommendations for maintenance or replacement rely on a fixed timeframe, and many user manuals state that optimum maintenance frequency is best determined by experience. However, because the rate of degradation depends greatly on external factors, unique to each process, a more accurate and predictive healthy lifespan for the sensor is needed. By predicting and displaying a healthy lifespan of the sensor to the user, the user can better prepare for the moment in time that maintenance will be required on the sensor. This will potentially extend the period between maintenance visits which could save the user maintenance resources, time, and the inconvenience of ordering new components when it might not yet be necessary. This would especially be useful for new customers who are not yet familiar with the healthy lifespan that they can expect from their sensors as well as being helpful in applications with variable process fluids.

One such type of process analytic sensor that requires maintenance and replacement is a pH sensor. A majority of the following description relates to the use of pH sensors. However, one skilled in the art will appreciate that pH sensors are used as an example only and the systems and methods that follow may be used in conjunction with other sensors as well.

pH is a measure of the acidity or alkalinity of a solution and can be determined using a pH-sensitive electrode. pH sensors are used in process control systems to measure the hydrogen or hydroxyl ion content of a process fluid. pH sensors commonly employ at least two electrodes, an ion-specific electrode (a pH electrode) and a reference electrode. In one example, a pH electrode utilizes a pH sensitive glass, in contact with a process fluid, which develops a potential (voltage) proportional to the pH of the process fluid. A reference electrode provides a known reference potential for the pH electrode. The difference in the potentials of the pH electrode and the reference electrode provides a millivolt signal proportional to the pH of the process fluid.

Over time, pH electrodes can experience aging which can result in changes to the electrical characteristics of the electrode. Electrode aging may be caused or accelerated by, for example, use in high temperatures, operation of the pH electrode in process fluids that have either high acidity or alkalinity, or incorrect handling of the pH electrode when not in use (e.g., incorrect cleaning and storage procedures). Electrode aging can cause an increase in impedance and response time, a declining slope, especially in the alkaline region, and a shift of the asymmetry potential, for example. Further, electrode aging can be indicative of changes in the chemical composition of the pH electrode membrane glass, steady growth of the internal membrane gel layer, and chemically or mechanically induced deterioration of the outer gel layer of the membrane during measurement and cleaning. Electrodes exposed to process fluids can become coated over time, which can cause an increase in electrode resistance. Electrodes can also become cracked or broken which can cause a sharp decrease in electrode resistance. As an electrode deteriorates, the ability of the sensor to accurately measure pH also deteriorates resulting in inaccurate or inconsistent pH level measurements.

To accommodate for this deterioration and know or estimate with accuracy when a sensor needs to be replaced, it can be beneficial to know the rate of degradation of the sensor. The rate of degradation of a given process analytic sensor can be determined during calibration or during process operation. During calibration or during process operation a fluid characteristic such as pH is detected. Then a sensor-related output, such as pH slope trend, offset, pH glass impedance or reference impedance, is calculated based on a fluid characteristic (e.g., pH). These sensor-related outputs can be obtained either during calibration or in process (i.e. during operation). The sensor-related output is compared to a previous sensor-related output, or to a known reference point for a new sensor. A statistical analysis, such as a least-squares fitting regression, can then be applied to the sensor-related outputs and/or reference points to calculate a rate of degradation for the sensor. The rate of degradation can be used to determine a healthy lifespan of the sensor. For example, the rate of degradation can be used to calculate the time until the sensor will degrade to point of unacceptable accuracy which is pre-selected as a threshold. When a sensor degrades past a point of unacceptable accuracy (i.e. the pre-selected threshold) the sensor is determined to be defective and in need of repair or replacement.

FIG. 1 is a partial cutaway view showing one example of an analytic sensor within a process environment. Flow-through insertion installation 100 includes process fluid pipe 107. Process fluid flows through the process fluid pipe 107 and through flow through insertion 112. Flow through insertion 112 is coupled at coupling junctions 108 and 109. Coupling junction 109 shows a threaded coupling assembly 110 whereby the flow-through insertion 112 is coupled to the process fluid pipe 107. Flow-through insertion installation 100 further contains pH sensor 101 coupled to the flow-through insertion 112 by use of threaded coupling assembly 111. pH sensor 101 includes a pH electrode assembly 103 that is exposed to process fluid to sense pH of the process fluid. pH sensor 101 is powered by its connection to a power source via power and communication cord 102. Power and communication cord 102 allows pH sensor 101 to communicate with a control room, a transmitter, measurement circuitry, processors, diagnostics components, and various other electronics. The sensor electronics can either be located at the end of the sensor or analog sensor signals can be sent through a cable, like power and communication cord 102, to electronics located remotely. It is within these electronics where diagnostics are done. While use of a cord is shown, various other techniques for power and communication could be used, such as, but not limited to, internal battery power or wireless communication.

Valves 104 and 105 control the flow of process fluid within flow through insertion 112. Valves 104 and 105 can be used to stop fluid flow to flow through insertion 112 which allows for cleaning, maintenance, or replacement of pH sensor 101. While threaded coupling assemblies are shown, it is contemplated that various alternative coupling methods could be used, such as, but not limited to, welds, flanges, press-fits, bolts, screws, fasteners, or any other satisfactory techniques.

While FIG. 1 shows a flow-through insertion installation, it is understood that this is but one example of a technique by which an analytic sensor can be exposed to a process fluid. Other such techniques could include, but are not limited to, direct process pipe mounting, low-flow cells, low-flow panels, fluid tank mounting, process fluid extraction and direct exposure, and any other satisfactory techniques.

Figure 2A:
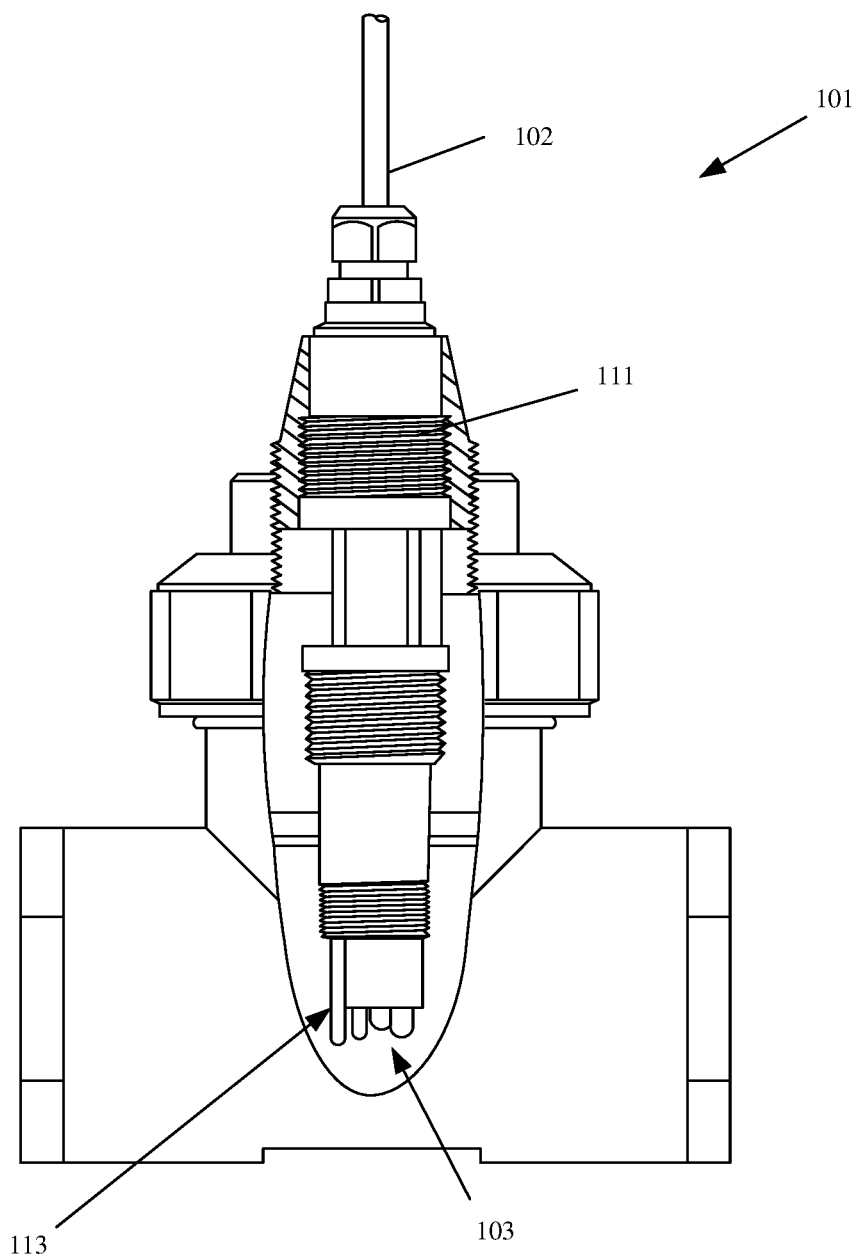
FIG. 2A is a side view showing one example of a pH sensor.

FIG. 2A is a side view showing one example of a pH sensor. pH sensor 101 includes power and communication cord 102, temperature element 113, threaded coupling 111 and pH electrode assembly 103. pH electrode assembly 103 includes a pH electrode and a reference electrode.

A typical pH sensor often consists of a pH electrode and reference electrode, each having a silver wire with a silver chloride coating at its end. The pH electrode has an internal-filled chloride buffer in aqueous solution having a selected pH that is often a pH of about 7 and a pH sensitive glass surrounding the internal silver wire and chloride buffer. The reference electrode has a container with an internal-filled reference solution of potassium chloride in aqueous solution. The pH-sensitive glass bulb encloses and contacts the internal chloride buffer and is then placed in an external liquid sample or process fluid to measure pH. The pH-sensitive has two hydrated gel layers, one layer on the inside surface and another on the outside surface.

The actual pH sensing is accomplished when a potential difference develops between the two hydrated gel layers. A hydrogen ion does not exist by itself in aqueous solution. It is associated with a water molecule to form a hydronium ion. The glass enclosed pH electrode develops a potential when hydronium ions get close enough to the glass bulb surface for hydrogen ions to jump and become associated with hydronium ions in an outer hydrated gel layer disposed on the glass bulb surface. This thin gel layer is essential for an electrode response.

Figure 2B:
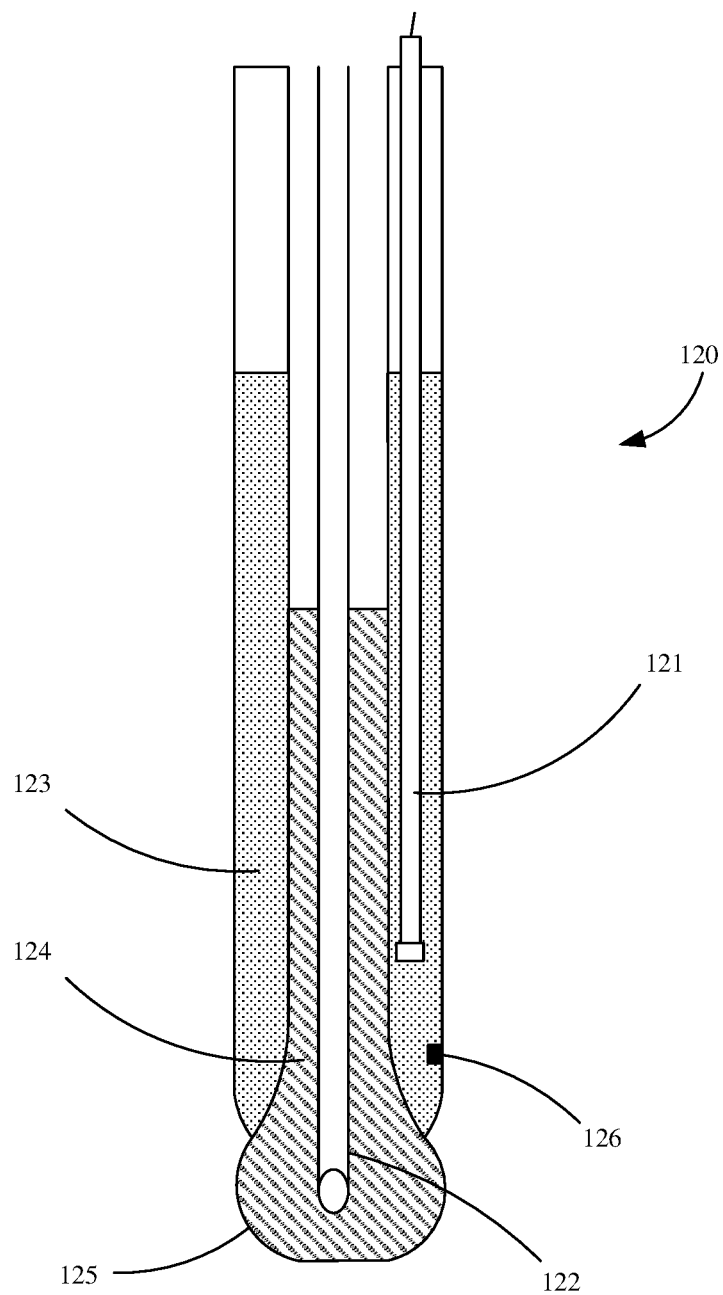
FIG. 2B is a cross sectional view showing one example of a pH sensor.

FIG. 2B is a cross sectional view showing one example of a pH sensor. pH sensor 120 includes reference electrode 121, pH electrode 122, reference solution 123 (such as potassium chloride in aqueous solution), internal buffer 124 (such as a chloride buffer in aqueous solution), glass membrane 125, which typically has two hydrated gel layers, and reference junction 126. The reference junction allows electrochemical interaction between the process fluid or sample solution and the reference solution.

Figure 3:
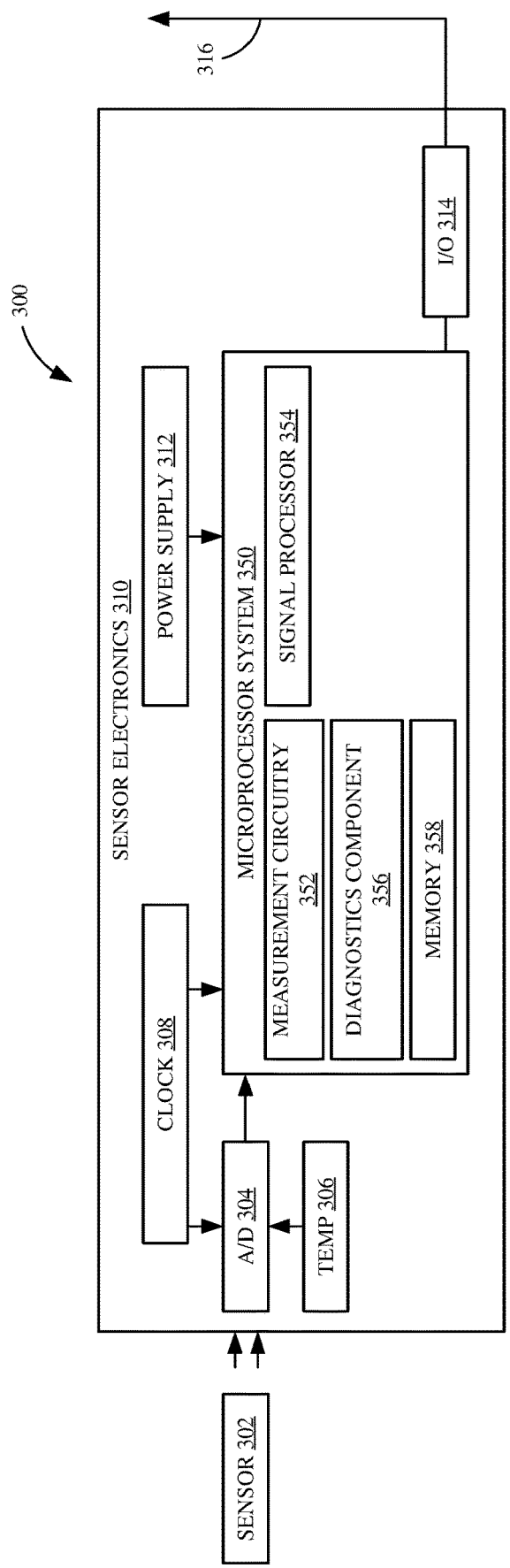
FIG. 3 is a simplified block diagram showing an example process analytic sensor system.

FIG. 3 is a simplified block diagram showing an example process analytic sensor system. Process analytic sensor system 300 includes pH sensor 302 which is electronically coupled to sensor system electronics 310. Sensor system electronics 310 as shown includes analog/digital convertor 304, which receives a signal from the pH sensor 302 and converts the signal from analog to digital. Electronics 310 further includes clock 308 which provides a timestamp for signals received and signals output by the analytic sensor system 300. In some embodiments, measurement of pH and sensor-related outputs are temperature dependent. A temperature element 306 can be provided to measure a temperature of the process fluid for which pH level is being determined. Microprocessor system 350 can utilize the signal from the temperature element 306 to compensate the pH accordingly. Electronics 310 also contain power supply 312 which provides power to the sensor system electronics 310 and to pH sensor 302.

Sensor system electronics 310 also contain microprocessor system 350, which receives the signal from the pH sensor 302 via analog/digital convertor 304 and provides a rate of degradation of the pH sensor. Microprocessor system 350 includes measurement circuitry 352, signal processor 354, diagnostics component 356, and memory 358. Measurement circuitry 352 receives the signal (such as millivolts) from pH sensor 302 and generates an indication of the pH of the process fluid based on the received signal from the pH sensor 302. Signal processor 354 receives the indication of pH from measurement circuitry 352 and calculates a sensor-related output (for example slope trend, offset, pH glass impedance, and/or reference impedance). Previous sensor-related outputs and known reference points (e.g., a known reference point for a new sensor) can be stored in memory 358. Previous sensor-related outputs are retrieved by pH sensor 302 either in-process through exposure to process fluid, or during calibration through exposure to known-value pH solutions. Diagnostics component 356 determines a rate of degradation of the pH sensor 302 by applying a statistical analysis, such as a least-squares fitting regression, on the sensor-related output and either a previous sensor-related output for a sensor or a known reference point for a new sensor. Keeping a stored memory of sensor-related outputs, reference points, indications of pH, sensor signals, and the like, will be advantageous for users, as it will increase efficiency, and provide historical data to track operational costs and trends. Finally, diagnostics component 356 uses the determined rate of degradation to predict a healthy lifespan for the pH sensor 302 (e.g., the time until the sensor reaches a point of unacceptable accuracy). The point of unacceptable accuracy can be user-selectable or set by a manufacturer, it could be based upon historical data from memory 358, manufacturer recommendations, or an unacceptable level of accuracy determined by a user.

Input/output logic 314 can receive the information (for example, indication of pH, slope trend, offset, impedance, millivolts, rate of degradation and healthy lifespan) from microprocessor system 350 and communicate it to a control room or a display, such as an LCD display, or a transmitter. Input/output logic 314 could communicate via a wired loop 316 or wirelessly.

Figure 4A:
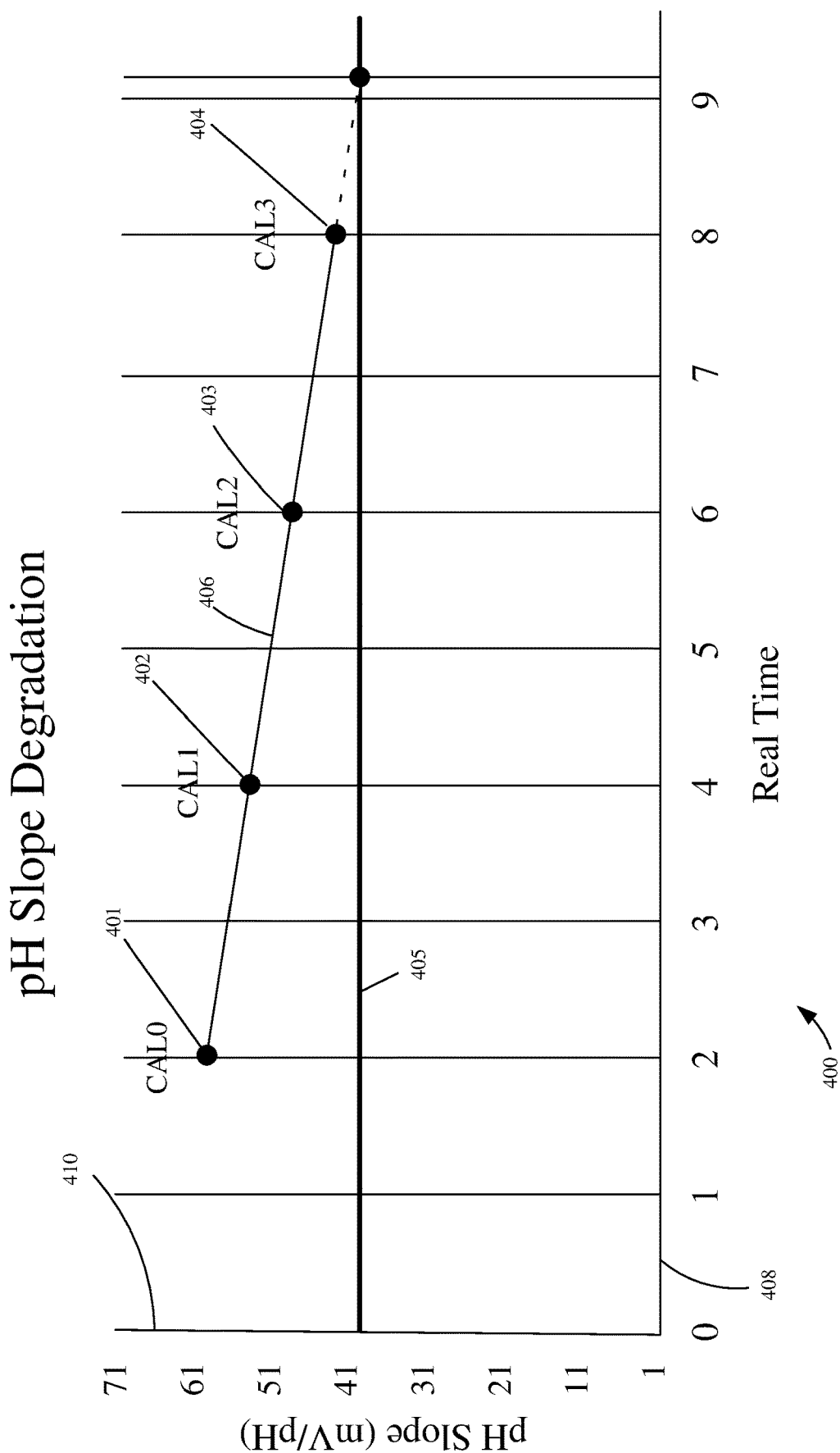
FIG. 4A is an example graph showing pH slope degradation.

FIG. 4A is an example graph showing pH slope degradation for a pH sensor. Graph 400 can be populated with calibration points (e.g., 401, 402, 403, and 404) gathered in a calibration process, for example, the calibration process described below. Graph 400 comprises X-axis 408 and Y-axis 410. Y-axis 410 is indicative of the pH slope (determined by the output of mV per pH unit change from pH 7). X-axis 408 is indicative of a progression of time. During calibration, a pH sensor is exposed to a buffer with a known-value pH (for example, 4.00, 7.00 or 10.00). Using the Nernst equation, the offset and slope of a pH sensor can be determined. Theoretically, the offset at a pH of 7.00 should be 0 mV, and the slope should be 59.16 mV per pH unit change. As shown in FIG. 4A, the graph 400 shows calibration points 401, 402, 403, and 404. At calibration point 401 the time value is 2 and the pH slope is approximately 59 mV per pH unit change. At calibration point 402 the time value is 4 and the pH slope is approximately 54 mV per pH unit change. At calibration point 403 the time value is 6 and the pH slope is approximately 49 mV per pH unit change. And calibration point 404 the time value is 8 and the pH slope is approximately 44 mV per pH unit change. Graph 400 also shows pre-selected performance threshold 405. Processor 354 calculates the slope at a given calibration time (based upon the indication of pH or mV from the measurement circuitry 352). The diagnostics component 356 then determines a rate of degradation of the pH sensor by extrapolating a function 406 (for example a least-squares fitting regression) based upon the sensor-related output (like pH slope) and a previous sensor-related output (like pH slope) or a known reference point for a new sensor (for example, and theoretically, a new sensor should have a pH slope of 59.16 mV per pH unit change). By extrapolating this function, the diagnostics component 356 can compare it to a pre-selected threshold like 405 to predict a healthy lifespan of the pH sensor (i.e. when the sensor's degradation will meet the threshold). Additionally, a max offset could be used as an indication of healthy lifespan. The offset could be trended during calibration, with a max offset used as a threshold, for example a manufacturer recommended max offset of 60 mV.

While FIG. 4A shows function 406 as linear, it should be mentioned that the rate of degradation of sensor over time may not be linear. As the rate of degradation is dependent upon external factors, the rate of change between points in time is variable. While only two points of reference are needed to extrapolate a function (for example, one sensor-related output obtained in-process or during calibration, and a known reference point for a new sensor), the more reference points that are obtained by the process analytic sensor system, the more accurate the prediction of healthy lifespan will be.

Figure 4B:
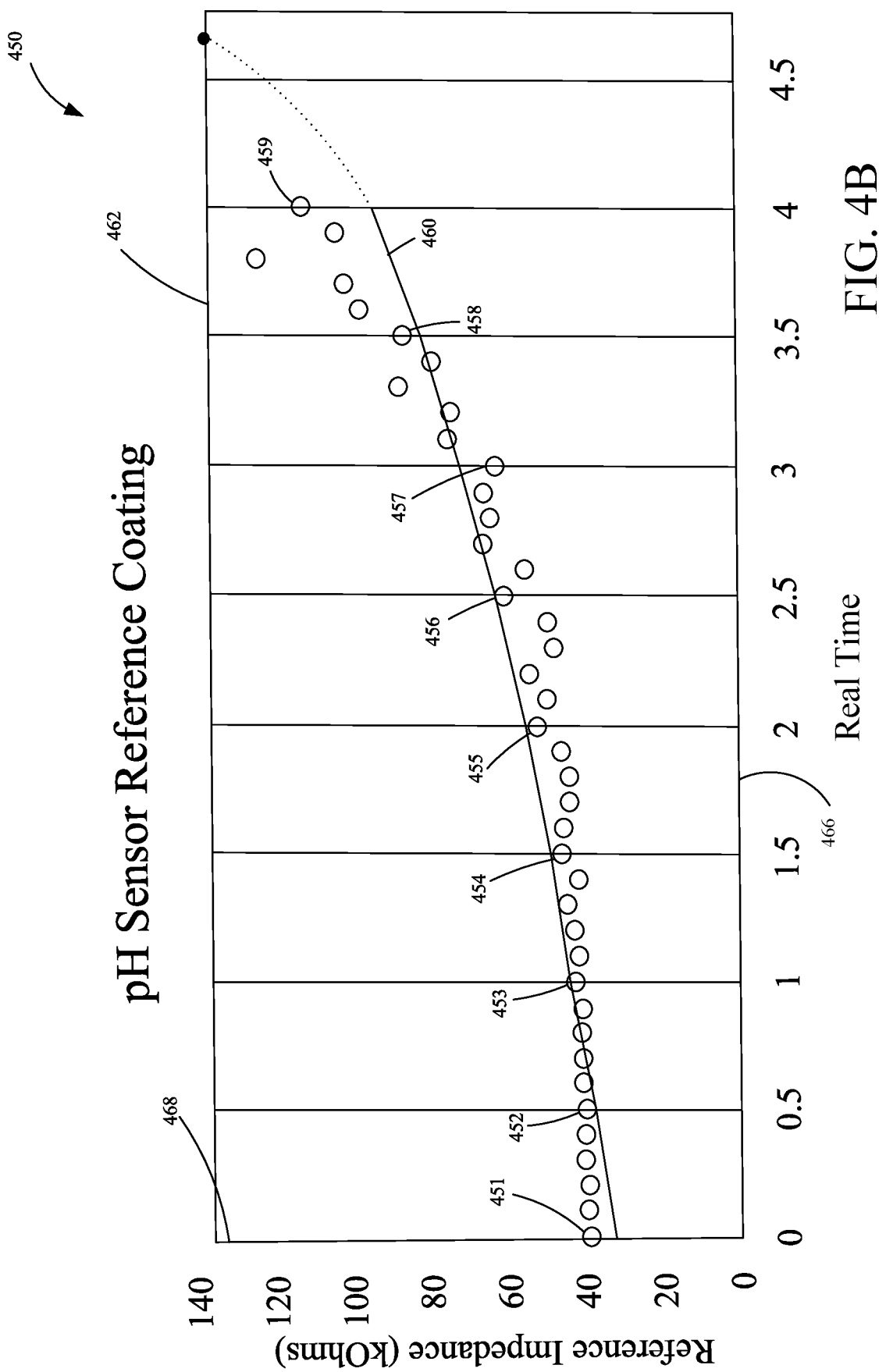
FIG. 4B is an example graph showing pH sensor reference coating.

FIG. 4B is an example graph showing pH sensor reference coating for a pH sensor. Graph 450 can be populated with reference points (e.g., 451, 452, 453, 454, 455, 456, 457, 458, and 459) gathered in-process. Graph 450 comprises X-axis 466 and Y-axis 468. Y-axis 468 is indicative of impedance measured in kOhms. X-axis 466 is indicative of a progression of time. Impedance increases over time, especially when the sensor becomes coated. A coated reference electrode junction can cause slow response, measurement drifts, and measurement inaccuracy. This value is measured in-process, and in one embodiment, data is acquired continuously, and the user is notified if the process analytic sensor system determines any unhealthy or troublesome trends. While FIG. 4B shows pH sensor reference coating, using reference impedance, it is contemplated that pH electrode impedance could also be measured and used to determine healthy lifespan of a pH sensor.

Graph 450 shows multiple reference points taken at different times. Specifically, reference points 451 at T0, 452 at T0.5, 453 at T1, 454 at T1.5, 455 at T2, 456 at T2.5, 457 at T3, 458 at T3.5, and 459 at T4. Reference point 451 is an example representation of a known starting impedance for a new pH sensor, at approximately 40 kOhms. Over time the reference impedance, measured in kOhms, begins to increase, reaching approximately 110 kOhms at reference point 459. Function 460 is an exemplary representation of a least-squares fitting regression. Graph 450 also shows pre-selected performance threshold 462 at approximately 140 kOhms. A user may pre-select a performance threshold for reference impedance, and the process analytic sensor system can provide a healthy lifespan of the pH sensor based upon a comparison of the rate of degradation and the pre-selected threshold. In one embodiment, the process analytic sensor system may provide an alert to the user when the healthy lifespan is within a certain threshold.

Additionally, pH glass impedance could be used and trended as an indication of a healthy lifespan for the sensor. The impedance of the reference and the impedance of pH glass can be measured separately. Both can give an indication of healthy lifespan of the pH sensor. And both can be measured in process (i.e. during operation).

While FIG. 4A and FIG. 4B show pH slope and reference impedance, it is contemplated that other reference points could be used to determine a healthy lifespan of a pH sensor. Such examples include, but are not limited to, pH offset, delay time of sensor response, stabilization time of the sensor, among others.

Figure 5:
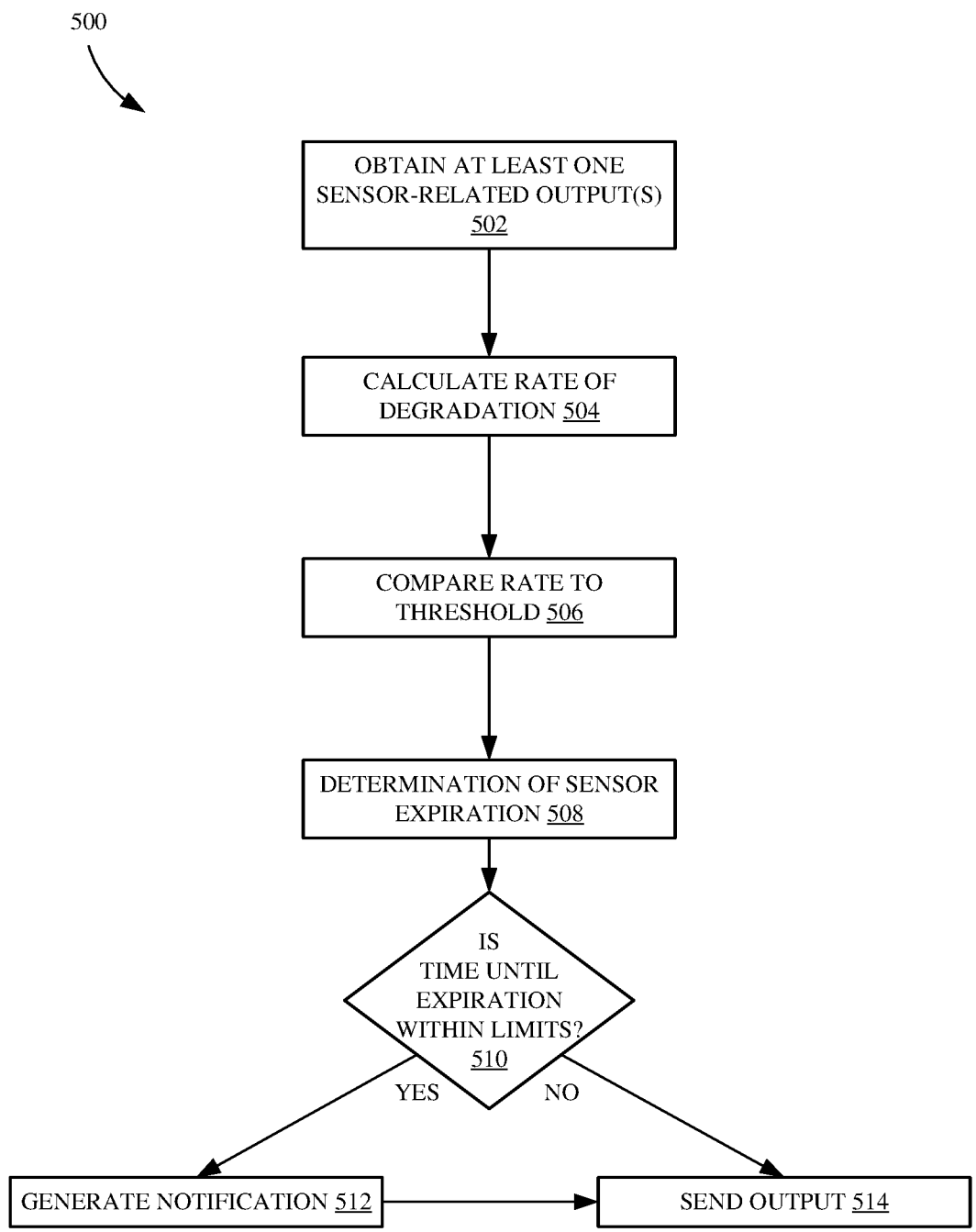
FIG. 5 illustrates an example method of determining a healthy lifespan of a given process analytic sensor.

FIG. 5 illustrates an example method of determining a healthy lifespan of a given process analytic sensor. Method 500 starts at block 502 where a sensor-related output is obtained. The sensor-related output can be pH offset 550, pH slope 552, impedance 554, or other 556, which could include, but is not limited to, time delay of the sensor or stabilization time of the sensor. After obtaining a sensor-related output at 502, method 500 proceeds at block 504 where the rate of degradation is determined based on the sensor-related output. As noted above, it is contemplated that a rate of degradation could be determined based on one sensor-related output and a previously known reference point for a new sensor (such as 0 mV at pH 7.00 or 59.16 mV per pH unit). However, the more sensor-related outputs obtained at 502, the more accurate the analysis will be. After determining the rate of degradation at 504 the method moves to block 506 where the rate of degradation is compared to a pre-selected performance threshold. After comparing the rate of degradation to a pre-selected performance threshold at block 506, the method moves to block 508 where a healthy lifespan of the sensor is determined. The healthy lifespan is the remaining time until the rate of degradation meets the pre-selected performance threshold (e.g., a level of unacceptable accuracy). The unit of time is not limited, and could contemplate seconds, minutes, hours, days, weeks, months, years, etc.

After determining the healthy lifespan of the sensor at block 508, method 500 proceeds at block 510 where it is determined whether the healthy lifespan of the sensor is within a pre-selected notification threshold. This pre-selected notification threshold could be time-based, where, for example, the user selects 7 days as the threshold. If the healthy lifespan of the sensor is 7 days or less then the method would move to block 512 where a notification would be generated automatically to notify the user. If the healthy lifespan is greater than 7 days, method 500 proceeds at block 514 where an output of the information would be sent to the user (via display, via loop to a control room, wirelessly, etc.). The unit of time is not limited, and could contemplate seconds, minutes, hours, days, weeks, months, years, etc.

The pre-selected notification threshold at block 510 is also not limited to units of time. It could also be a value-based notification threshold. For example, if impedance is the sensor-based output, then the user could select a notification threshold for block 510 that determines a unit of difference between the pre-selected performance threshold at block 506 and the value of the sensor-based output. Turning back to FIG. 4B for illustration, the user could select a block 510 notification threshold of 20 kOhms, with a block 506 performance threshold of 140 kOhms. If the sensor-based output (i.e. impedance measured in kOhms) is within 20 kOhms of the block 506 performance threshold, an alarm would be generated at block 512. It is also contemplated that a notification could be generated at block 512 even when the healthy lifespan is not within the pre-selected notification threshold. If, for example, the user selects 7 days as the notification threshold, but calibration only occurs once every 10 days, and the healthy lifespan is 8 days, an alarm could be generated at block 512 because the healthy lifespan of the sensor will expire prior to the next calibration.

Additionally, both pH glass impedance and reference impedance can be done in process, not just during calibration. Continuous measurements of both or either could be taken at set intervals or random intervals in process (i.e. during operation). The reference points from those measurements could be trended as an indication of a healthy lifespan for the sensor.

Furthermore, the sensor-related outputs could be obtained from known sample solutions, for example a sample solution with a known pH, or from unknown sample solutions, for example a sample solution without a known pH (like a process fluid).

Figure 6:
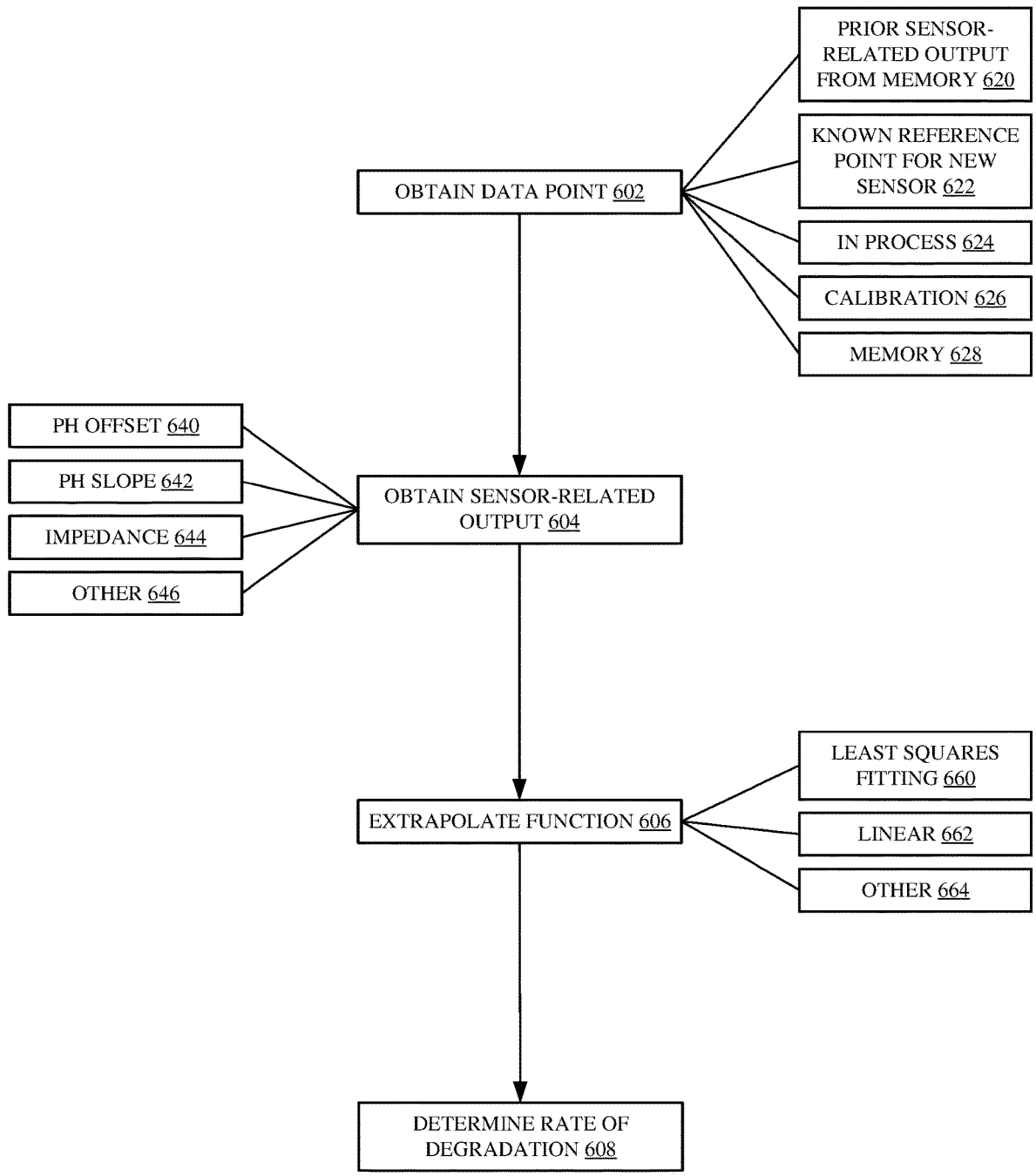
FIG. 6 illustrates an example method of determining a rate of degradation for a sensor.

FIG. 6 illustrates an example method of determining a rate of degradation for a sensor. Method 600 starts at block 602 where a data point is obtained. The data point can either be a prior sensor-related output 620 or a known reference point 622 (e.g., a reference point for a new sensor, such as 0 mV at pH 7). The data point can be obtained in-process 624, during calibration 626, or from memory 628 (such as memory 358 in FIG. 3). Method 600 proceeds at block 604 where a sensor-related output is obtained. The sensor-related output can be pH offset 640, pH slope 642, impedance 644, or others 646, such as, but not limited to, the time it takes for the pH sensor to stabilize or the time delay in receiving a response from the pH sensor. Method 600 proceeds at block 606 where a function is extrapolated based on the obtained data point 602 and the obtained sensor-related output 604. It should be noted that obtaining more than one data point and more than one sensor-related output is contemplated. Obtaining a plurality of data points and sensor-related outputs is advantageous in that it improves accuracy of the extrapolated function 606. Extrapolated function 606 could include a least-squares fitting regression 660, a linear function 662, or other known extrapolation methods 664. Method 600 proceeds at block 608 where the rate of degradation is determined based on the extrapolated function 606.

Although the present invention has been described with reference to preferred embodiments, workers skilled in the art will recognize that changes may be made in form and detail without departing from the spirit and scope of the invention. Moreover, while embodiments of the present invention have generally been described with respect to a pH sensor, embodiments are practicable with any process analytic sensor where the rate of degradation for the sensor is dependent on external factors and sensor-related outputs can be used to determine a rate of degradation.

What is claimed is:

1. A process analytic system comprising:
   a pH sensor configured to sense pH of a process fluid;
   measurement circuitry coupled to the pH sensor, the measurement circuitry being configured to generate an indication of the pH of the process fluid;
   a processor coupled to the measurement circuitry and configured to receive the indication of the pH of the process fluid and calculate a sensor-related output including offset based on the indication of the pH of the process fluid; and
   a diagnostics component configured to determine a rate of degradation of the pH sensor based on the sensor-related output and a reference value, wherein the rate of degradation is compared to a pre-selected threshold.

2. The process analytic system of claim 1, wherein the sensor-related output includes pH slope.

3. The process analytic system of claim 1, wherein the sensor-related output includes reference impedance.

4. The process analytic system of claim 1, wherein the sensor-related output includes pH glass impedance.

5. The process analytic system of claim 1, wherein the sensor-related output is calculated during calibration.

6. The process analytic system of claim 1, wherein the sensor-related output is calculated in process.

7. The process analytic system of claim 1, wherein the diagnostics component determines the rate of degradation using a least-squares fitting regression.

8. The process analytic system of claim 1, wherein the reference value is a previous sensor-related output.

9. The process analytic system of claim 1, wherein the reference value is a known value for a new sensor.

10. The process analytic system of claim 1, wherein the sensor-related output is paired with a timestamp and compared with a previously attained sensor-related output having a separate timestamp.

11. A method of determining a rate of degradation of a pH sensor, the method comprising:
- obtaining a plurality of sensor-related outputs over time;
- fitting the plurality of sensor-related outputs over time to an estimation function;
- calculating a rate of degradation based on the sensor-related outputs using the estimation function;
- comparing the rate of degradation to a pre-selected threshold;
- determining, based on the comparison, a predictive healthy lifespan of a sensor; and
- generating a display indicative of the predictive healthy lifespan of the sensor.

12. The method of claim 11, wherein the estimation function employs a least-squares fitting regression.

13. The method of claim 11, wherein the pre-selected threshold is user selected.

14. The method of claim 11, wherein the pre-selected threshold is preset by a manufacturer.

15. The method of claim 11, wherein the pre-selected threshold is based on historical data.

16. The method of claim 11, wherein the sensor-related output can be obtained during calibration or in process.

17. The method of claim 11, wherein the sensor-related output can be obtained from an unknown sample solution or from a known sample solution.

18. A process analytic system comprising:
- an analytic sensor configured to sense a characteristic of a fluid;
- measurement circuitry coupled to the analytic sensor configured to generate an indication of the characteristic of a fluid;
- a processor coupled to the measurement circuitry and configured to receive the indication of the characteristic of the fluid and calculate a sensor-related output value based on the indication of the characteristic of the fluid; and
- a diagnostics component configured to:
  - determine a rate of degradation of the analytic sensor based on a curve fit of the sensor-related output value and a reference value; and
  - determine a predictive healthy lifespan of the analytic sensor based on the rate of degradation and a pre-selected threshold value; and
- sensor electronics configured to generate an output to provide a display indicative of the predictive healthy lifespan of the analytic sensor.

* * * * *